United States Patent
Cecchi et al.

(10) Patent No.: US 9,736,301 B2
(45) Date of Patent: *Aug. 15, 2017

(54) USING GRAPHICAL TEXT ANALYSIS TO FACILITATE COMMUNICATION BETWEEN CUSTOMERS AND CUSTOMER SERVICE REPRESENTATIVES

(71) Applicant: International Business Machines Corporation, Armonk, NY (US)

(72) Inventors: Guillermo A. Cecchi, New York, NY (US); James R. Kozloski, New Fairfield, CT (US); Clifford A. Pickover, Yorktown Heights, NY (US); Irina Rish, Rye Brook, NY (US); Ajay K. Royyuru, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,594

(22) Filed: Sep. 23, 2016

(65) Prior Publication Data

US 2017/0013126 A1 Jan. 12, 2017

Related U.S. Application Data

(63) Continuation of application No. 14/645,659, filed on Mar. 12, 2015, now Pat. No. 9,531,875.

(51) Int. Cl.
*H04M 3/00* (2006.01)
*H04M 5/00* (2006.01)
(Continued)

(52) U.S. Cl.
CPC ...... *H04M 3/4936* (2013.01); *G06F 17/2785* (2013.01); *H04M 3/5175* (2013.01);
(Continued)

(58) Field of Classification Search
CPC .......... G06F 17/2785; H04M 2201/40; H04M 2201/42; H04M 3/4936; H04M 3/5175;
(Continued)

(56) References Cited

U.S. PATENT DOCUMENTS 6,324,536 B1\* 11/2001 Rofrano ............ G06F 17/30265
707/722
7,007,235 B1\* 2/2006 Hussein ................. G06Q 10/10
715/751

(Continued)

OTHER PUBLICATIONS

List of IBM Patents or Patent Applications Treated as Related; YOR920140495US3, Date Filed: Sep. 23, 2016, p. 1-2.

(Continued)

*Primary Examiner* — Khai N Nguyen
(74) *Attorney, Agent, or Firm* — Cantor Colburn LLP; Alexa Ashworth

(57) ABSTRACT

Embodiments relate to facilitating communications between customers and customer service representatives. A method for facilitating communications between customers and customer service representatives is provided. The method generates a graph of expressions of a customer. The method generates a graph of expressions of each customer service representative of a plurality of customer service representatives. The method performs a graphical text analysis on the graph for the customer to identify an interaction style of the customer. The method performs a graphical text analysis on the graph for each customer service representative to identify an interaction style of the customer service representative. The method selects a customer service representative from the plurality of the customer service representatives (Continued)

based on the interaction style of the customer and the interaction styles of the plurality of the customer service representative. The method starts a communication between the customer and the selected customer service representative.

18 Claims, 6 Drawing Sheets

(51) Int. Cl.
*H04M 3/493* (2006.01)
*H04M 3/51* (2006.01)
*H04M 3/54* (2006.01)
*H04M 3/523* (2006.01)
*G06F 17/27* (2006.01)

(52) U.S. Cl.
CPC ....... *H04M 3/5183* (2013.01); *H04M 3/5191* (2013.01); *H04M 3/5232* (2013.01); *H04M 3/5233* (2013.01); *H04M 3/5235* (2013.01); *H04M 3/54* (2013.01); *H04M 2201/40* (2013.01); *H04M 2201/42* (2013.01)

(58) Field of Classification Search
CPC ............. H04M 3/5183; H04M 3/5191; H04M 3/5232; H04M 3/5233; H04M 3/5235; H04M 3/54
USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1

See application file for complete search history.

(56) References Cited

U.S. PATENT DOCUMENTS

| | | | |
|---|---|---|---|
| 9,531,875 B2* | 12/2016 | Cecchi | H04M 3/4936 |
| 9,584,659 B2* | 2/2017 | Cecchi | H04M 3/4936 |
| 2013/0208881 A1* | 8/2013 | Pande | H04M 3/5175 |
| | | | 379/265.07 |
| 2014/0330548 A1* | 11/2014 | Appel | G06Q 10/101 |
| | | | 703/6 |
| 2014/0362091 A1* | 12/2014 | Bouaziz | G06T 13/40 |
| | | | 345/473 |
| 2014/0365504 A1* | 12/2014 | Franceschini | G06F 17/30958 |
| | | | 707/748 |
| 2015/0077428 A1* | 3/2015 | Stevens | G06T 11/206 |
| | | | 345/589 |
| 2015/0095303 A1* | 4/2015 | Sonmez | G06N 5/003 |
| | | | 707/707 |
| 2016/0188566 A1* | 6/2016 | Jifroodian-Haghighi | G09B 5/02 |
| | | | 704/10 |
| 2016/0269554 A1* | 9/2016 | Cecchi | H04M 3/4936 |
| 2016/0269555 A1* | 9/2016 | Cecchi | H04M 3/4936 |
| 2017/0013126 A1* | 1/2017 | Cecchi | H04M 3/4936 |

OTHER PUBLICATIONS

Guillermo A. Cecchi, "Using Graphical Text Analysis to Facilitate Communication Between Customers and Customer Service Representatives" U.S. Appl. No. 15/274,594, filed Sep. 23, 2016.

* cited by examiner

USING GRAPHICAL TEXT ANALYSIS TO FACILITATE COMMUNICATION BETWEEN CUSTOMERS AND CUSTOMER SERVICE REPRESENTATIVES

DOMESTIC PRIORITY

This application is a continuation of U.S. patent application Ser. No. 14/645,659, entitled "USING GRAPHICAL TEXT ANALYSIS TO FACILITATE COMMUNICATION BETWEEN CUSTOMERS AND CUSTOMER SERVICE REPRESENTATIVES," filed Mar. 12, 2015, the disclosure of which is incorporated by reference herein in its entirety.

BACKGROUND

The present invention relates generally to facilitating communications between customers and customer service representatives, and more specifically to facilitating communications between the customers and the customer service representatives based on a graphical text analysis of the expressions made by the customers and the customer service representatives.

A communication between a customer and a customer service representative in a customer service environment is often marked by inefficiency and frustration on both sides of the communication due to a mismatch between the customer service representative's communication or cognitive style and that of the customer. Such inefficiency and frustration may be resolved or avoided if more detailed information about the customer's desires, intentions, emotional states, etc., is provided to the customer service representative.

SUMMARY

Embodiments include a computer program product, a method, and a system for facilitating communications between customers and customer service representatives. According to an embodiment of the present invention, a computer program product is provided. The computer program product comprises a computer readable storage medium having program instructions embodied therewith. The program instructions readable by a processing circuit cause the processing circuit to perform a method of facilitating communications between customers and customer service representatives. The method generates a graph of expressions of a customer. The method generates a graph of expressions of each customer service representative of a plurality of customer service representatives. The method performs a graphical text analysis on the graph for the customer to identify an interaction style of the customer. The method performs a graphical text analysis on the graph for each customer service representative to identify an interaction style of the customer service representative. The method selects a customer service representative from the plurality of the customer service representatives based on the interaction style of the customer and the interaction styles of the plurality of the customer service representative. The method starts a communication between the customer and the selected customer service representative.

According to another embodiment of the present invention, a method for facilitating communications between customers and customer service representatives is provided. The method generates a graph of expressions of a customer. The method generates a graph of expressions of each customer service representative of a plurality of customer service representatives. The method performs a graphical text analysis on the graph for the customer to identify an interaction style of the customer. The method performs a graphical text analysis on the graph for each customer service representative to identify an interaction style of the customer service representative. The method selects a customer service representative from the plurality of the customer service representatives based on the interaction style of the customer and the interaction styles of the plurality of the customer service representative. The method starts a communication between the customer and the selected customer service representative.

According to a further embodiment of the present invention, a computer system for facilitating communications between customers and customer service representatives is provided. The computer system comprises a memory having computer readable instructions and a processor configured to execute the computer readable instructions. The instructions comprise generating a graph of expressions of a customer. The instructions further comprise generating a graph of expressions of each customer service representative of a plurality of customer service representatives. The instructions further comprise performing a graphical text analysis on the graph for the customer to identify an interaction style of the customer. The instructions further comprise performing a graphical text analysis on the graph for each customer service representative to identify an interaction style of the customer service representative. The instructions further comprise selecting a customer service representative from the plurality of the customer service representatives based on the interaction style of the customer and the interaction styles of the plurality of the customer service representative. The instructions further comprise starting a communication between the customer and the selected customer service representative.

BRIEF DESCRIPTION OF THE DRAWINGS

The subject matter which is regarded as embodiments of the invention is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In some embodiments of the invention, the systems and methods perform a graphical text analysis on the expressions of a customer to identify the interaction style of the customer. The systems and methods also perform a graphical text analysis on the expressions of each of a plurality of customer service representatives to identify the interaction style of each customer service representative. The systems and methods select a customer service representative who has the interaction style that best matches the interaction style of the customer. The systems and methods allow the selected customer service representative to communicate with the customer to serve the needs of the customer.

During the communication, the systems and methods update the graphs for the customer and the customer service representative and continue to perform graphical text analysis on the graphs being updated in order to identify any change in the complementariness between the interaction styles of the customer and the customer service representative. In some embodiments, the system and methods provide a set of prompts or a service script to the customer service representative to guide the representative during the communication, or may switch the customer to another customer service representative whose interaction style better complements the current interaction style of the customer.

In this disclosure, a communication between a customer and a customer service representative may be an electronic communication (e.g., faxes, phone calls, online audio/video/text chats, text messaging, postings on social media, emails, etc.), of which the content is textual or may be converted to text. A customer is a person who consumes the services or products provided by a business represented by customer service representatives and may be referred to as a client. A customer service representative is a person serving the needs of the customers regarding the services and/or the products a business offers, and are commonly referred to as a customer service agent, a customer support representative/agent, a help agent, etc.

An interaction style or a communication style refers to the attributes of interaction or communication that a person implicitly or explicitly reveals through spoken and physical expressions during a conversation. Different persons have different interaction styles, and a person's interaction style may change over a course of a conversation. A person's interaction style may be defined by, e.g., interests, knowledge, goals (seeking help, providing help), desires, and cognitive and emotional states (e.g., anger, frustration, irritation, happiness, satisfaction, etc.).

Figure 1:
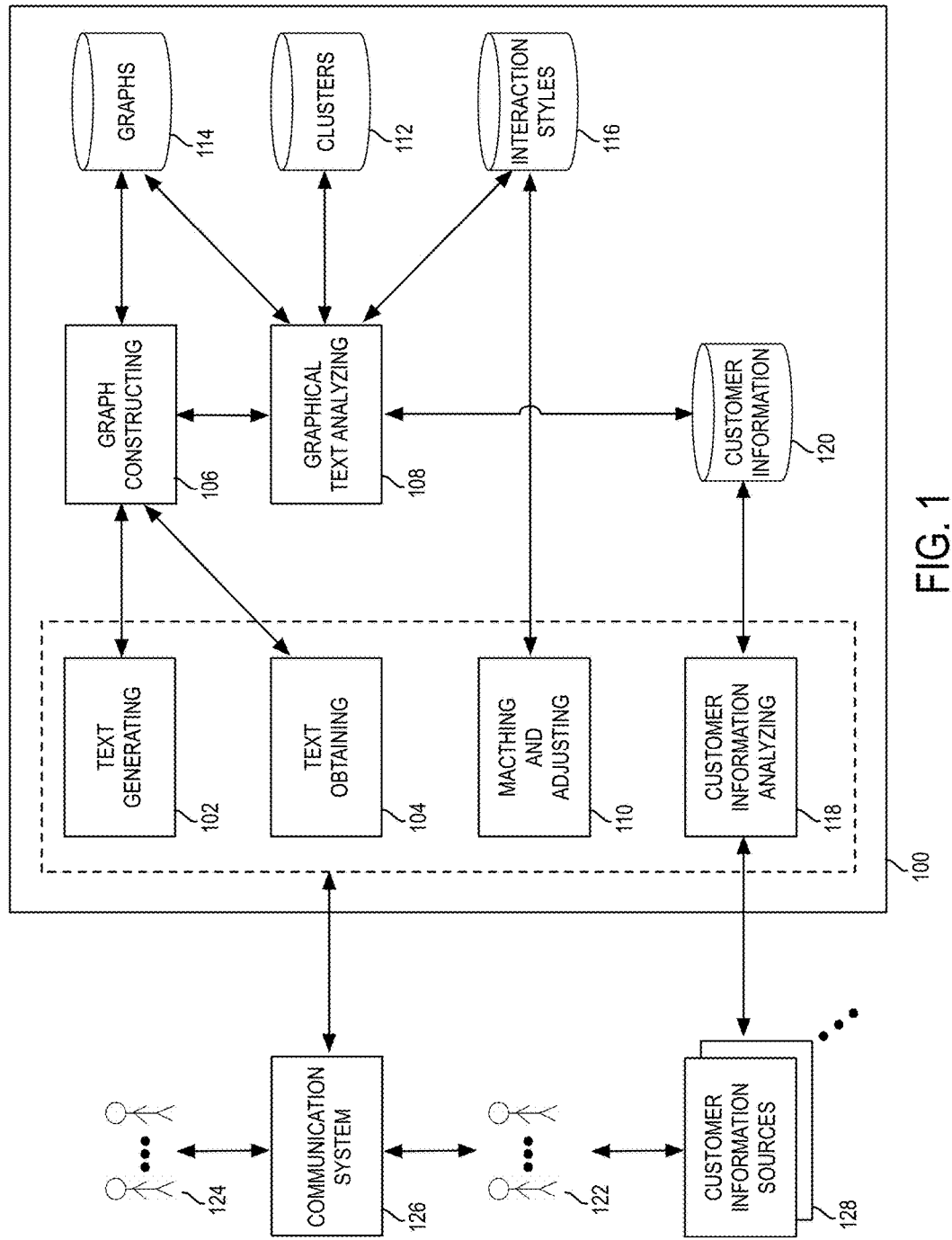
FIG. 1 depicts a system for facilitating communications between customers and customer service representatives according to an embodiment of the invention.

FIG. 1 illustrates a system 100 for facilitating communications between customers and customer service representatives. In some embodiments, the system 100 includes modules, sub-modules and datastores such as a text generating module 102, a text obtaining module 104, a graph constructing module 106, a graphical text analyzing module 108, a matching and advising module 110, a matching and advising module 110, a customer information analyzing module 118, a clusters repository 112, a graphs repository 114, an interaction styles repository 116, and a customer information repository 120. FIG. 1 also illustrates customers 122, customer service representatives 124, a communication system 126, and customer information sources 128.

The customers 122 are the customers of a business, and the customer service representatives 124 represent the business and may communicate with the customers 122 via the communication system 126. The customer use communication devices (not shown) including computing devices (e.g., smartphones, tablets, laptops, etc.), fax machines, phones, etc. to access the communication system 126. The computing devices may run one or more communication tools (e.g., a web browser, a chatting software tool, an email client, a proprietary application provided by the business, etc.) that allow the customers 122 to communicate with the customer service representatives 124 via the communication system 126. These communication devices are connected to the communication system 126 over one or more networks (not shown). The customer service representatives 124 use communication devices that are similar to or correspond to the communication devices that the customers 122 use.

The communication system 126 facilitates communications between the customers 122 and the customer service representatives 124. For instance, the communication system 126 may implement a web server, an email server, a social network service, an online chat server, a fax server, etc. In some embodiments, the communication system 126 may execute one or more artificial agents that may communicate with the customers as customer service representatives. For example, an artificial agent may initially communicate with a customer who accessed the communication system 126 before the customer is switched to a human customer service representative.

In some embodiments, the communication system 126 pushes content of the communications to the system 100, or the communication system 126 may allow the system 100 to retrieve the content of the communications. In some embodiments, the communication system 126 is remotely connected to the system 100 via one or more networks (e.g., Internet). In other embodiments, the communication system 126 may be part of the system 100. The content includes audible and/or textual expressions that the customers 122 and the customer service representatives 124 make.

The text generating module 102 transcribes the audible expressions obtained from the communications system 126 into text. The text generating module 102 may use one or more now known or later developed speech-to-text techniques for converting audible expressions into text. The text obtaining module 104 obtains the textual expressions from the communication system 126.

The graph constructing module 106 receives the text of the expressions made by the customers 122 and the customer service representatives 124 from the text generating module 102 and/or the text obtaining module 104. The graph constructing module 106 builds graphs from the received text for the customers 122 and the customer service representatives 124.

More specifically, in some embodiments, the graph constructing module 106 extracts syntactic features from the received text and converts the extracted features to vectors. These syntactic vectors may have binary components for the syntactic categories such as verb, noun, pronoun, adjective, lexical root, etc. For instance, a vector [0,1,0,0 . . . ] represents a noun-word in some embodiments.

The graph constructing module 106 may also generate semantic vectors from the received text using one or more now known or later developed techniques (e.g., Latent Semantic Analysis and WordNet). The semantic content of each expression in the text may be represented by a vector, of which the components are determined by Singular Value Decomposition of word co-occurrence frequencies over a large database of documents.

Figure 2:
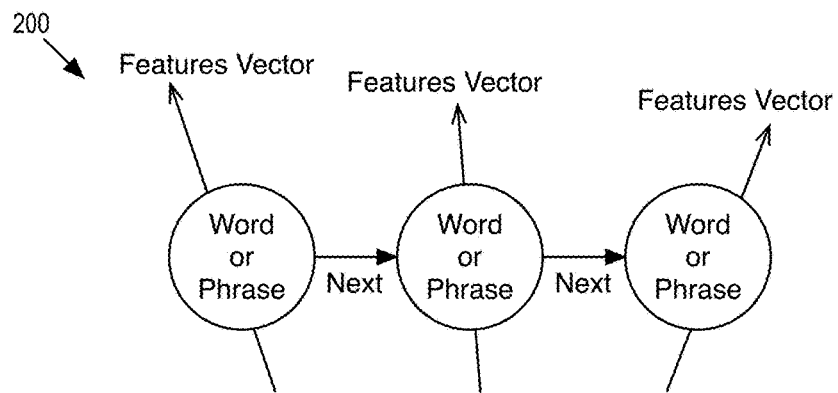
FIG. 2 depicts a graph of expressions according to an embodiment of the invention.

A graph generated by the graph constructing module 106 may be in the form of: $G=\{N, E, \breve{W}\}$, where the nodes N represent tokens (e.g., words or phrases), the edges E represent temporal precedence in the customer' expressions, and each node possesses a feature vector $\breve{W}$ defined in some embodiments as a direct sum of the syntactic and semantic vectors and additional non-textual feature vector (e.g., a predetermined vector for the identity of a customer). That is, in some embodiments, the feature vector $\breve{W}$ is defined by the equation: $\breve{W}=\breve{w}_{sym}\oplus\breve{w}_{sem}\oplus\breve{w}_{ntxt}$, where $\breve{W}$ is the feature vector, $\check{w}_{sym}$ is the syntactic vector, $\check{w}_{sem}$ is the semantic vector, and $\check{w}_{ntxt}$ is the non-textual features. An example graph 200 that may be generated by the graph constructing module 106 is shown in FIG. 2. As shown, the graph 200 is a directed graph that includes an ordered set of expressions (e.g., words or phrases), each with a feature vector. Loops may form in this graph if the same expressions are made more than once.

Referring back to FIG. 1, the graph constructing module 106 of some embodiments builds one graph that includes the expressions of the customers and customer service representatives in communication with each other. Alternatively or conjunctively, the graph constructing module 106 builds one graph for each customer and one graph for each customer service representative. In some embodiments, the graph constructing module 106 generates graphs for the customer service representatives for all expressions the representatives make throughout a period of time (e.g., the same working day, the last one hour, the last one week, etc.). The graph constructing module 106 stores the generated graphs for the customers and the customer service representatives in the graphs repository 114. The graph constructing module 106 also updates the graphs as more text from the customer-customer service representative communications is received from the text generating module 102 and/or the text obtaining module 104.

The graphical text analyzing module 108 performs a graphical text analysis on each graph generated by the graph constructing module 106. As a specific example of a graphical text analysis, in some embodiments, the graphical text analyzing module 108 analyzes the graph G for a customer or a customer service representative generated by the graph constructing module 106 based on a variety of topological features. The variety of features include graph-theoretical topological measures of the graph skeleton (i.e., a graph without features vectors: $G_{sk}=\{N, E\}$) such as degree distribution, density of small-size motifs, clustering, centrality, etc. Similarly, additional values may be extracted by including the features vectors for each node of the graph. One such instance is the magnetization of the generalized Potts model (e.g., $H=\beta \Sigma_n E_{nm} \check{W}_n T \check{W}_m$) such that temporal proximity (e.g., number of edges between two nodes) and feature similarity are taken into account. These features, which incorporate the syntactic, semantic and dynamical components of the expressions, are then combined as a multi-dimensional features vector $\check{F}$ that represents a sample. This feature vector is finally used to train a standard classifier: $M=M(\check{F}_{train}, C_{train})$, to discriminate the samples that belong to different conditions C, such that for each sample the classifier estimates its condition identity based on the extracted features: $C(sample)=M(\check{F}_{sample})$.

In some embodiments, the graphical text analyzing module 108 compares the graph with the clusters of previously generated graphs stored in the clusters repository 112. More specifically, the feature vectors of previously generated graphs with known interaction styles are plotted in a multi-dimensional text feature space to form clusters in that space. The graphical text analyzing module 108 plots the feature vectors of the graph for the customer or the customer service representative in the space, in order to determine whether the graph belongs to a cluster based on, e.g., distance between the plots of the graph and the plots of the clusters. In some embodiments, the graphical text analyzing module 108 also determines for each cluster a likelihood of the graph to belong to the cluster (e.g., the level of correlation between the graph and the cluster). If the plots of the graph are determined to fall in the feature space of a particular cluster (e.g., for having the likelihood of the graph belong to the cluster over a threshold), the corresponding interaction style represented by the cluster is determined as the interaction style of the customer. The graphical text analyzing module 108 stores the identified interaction style of each customer and each customer service representative in the interaction styles repository 116.

The graphical text analyzing module 108 of some embodiments continuously performs graphical text analysis on the graph as the graph is being updated by the graph constructing module 106. As a result, the interaction style for a customer or a customer service representative may change as the graph for the customer or the customer service representative is updated. The graphical text analyzing module 108 updates the interaction styles repository 116 accordingly so that the interaction styles repository 116 has the current interaction styles of the customers and the customer service representatives. In some embodiments, the interaction styles repository 116 also maintains a history of interaction styles for the customers and the customer service representatives. As such, the functioning of the system 100, which may be implemented in a computer system (e.g., computer system 12 described further below with reference to FIG. 5), may be improved.

Figure 3:
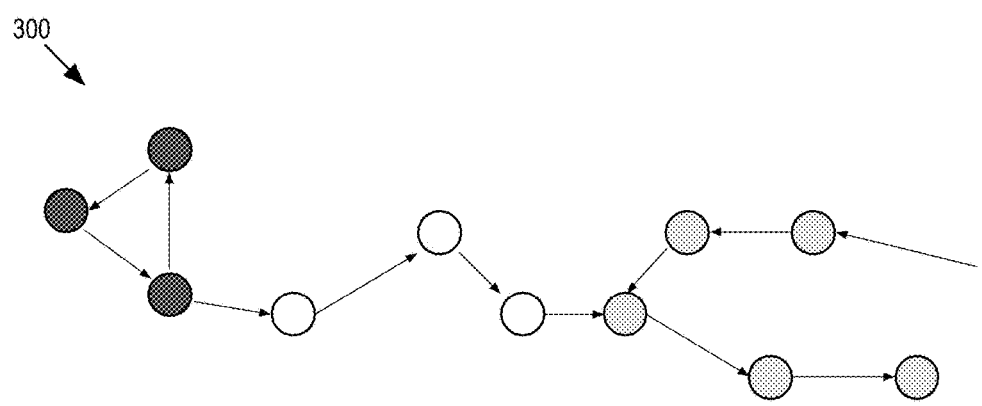
FIG. 3 depicts a graph of expressions according to an embodiment of the invention.

The graphs constructing module 106 may also generate a composite graph for a group of customers by, e.g., merging the graphs for individual customers. In some embodiments, each node of a composite graph generated for the group of customers indicates who is the speaker of the words or phrases of the node. The order of the conversation may be captured and preserved in the composite graphs. The graphs constructing module 106 stores the composite graphs for the groups in the graphs repository 114. FIG. 3 illustrates an example graph 300 for a group of three customers. As described above, the nodes for different customers may include information about the identities of the customers. Specifically, the nodes for a customer are depicted in black, the nodes for another customer are depicted in white, and the nodes for yet another customer are depicted in grey.

Referring back to FIG. 1, the graphical text analyzing module 108 performs the same graphical text analysis on each composite graph to identify a collective interaction style of a group of customers. Each group of customers therefore represents a super-organism, a hive mind, or a composite person that is reflective of more than one customer. In some embodiments, a super-organism may take the form of a customer and a customer service representative dyad for which the customer and the customer service representative are analyzed as one unit. Based on such an analysis of the super-organism dyad, the graphical text analyzing module 108 may make additional inferences that may be used to select a set of prompts to use or may be used to switch the customer to a different customer service representative, as will be described further below. In some embodiments, a customer may also be an individual customer teamed with a helper artificial agent with natural language processing capabilities so as to form a composite customer. A customer may also be an artificial agent that acts on behalf of a human customer. Thus, the graphical text analysis is performed on linguistic output of an artificial agent who may participate in a communication with a customer service representative or may help a human customer.

In some embodiments, the graphical text analyzing module 108 may give different weights to different customers in a group. For instance, a primary customer in communication with a customer service representative may receive a bigger weight than other customer in the communication. The weights may depend on various factors such as a person's position in a company, a measure of network connectivity in a social network, etc. These factors may be retrieved from the customer information repository 120.

The matching and advising module 110 matches a customer with a customer service representative based on the interaction styles of the customer and the available customer service representatives. Specifically, in some embodiments, the matching and advising module 110 identifies a customer who accessed the communication system 126 to communicate with a customer service representative. The matching and advising module 110 finds the interaction style of this customer in the interaction styles repository 116 and selects a customer service representative whose interaction style best matches with the interaction style of the customer. For instance, in some embodiments, the matching and advising module 110 selects a customer service representative whose interaction style is closest to or the same as the interaction style of the customer. Alternatively or conjunctively, the matching and advising module 110 selects a customer service representative whose interaction style complements the interaction style of the customer. For example, when the interaction style of the customer indicates the customer is angered or frustrated, the matching and advising module 110 selects a customer service representative whose interaction style indicates the representative is calm and patient. In some embodiments, the matching and advising module 110 uses a predefined matching table for different interaction styles of the customer and different states of the customer service representatives. The matching and advising module 110 notifies the communication system 126 of a match so that the communication system 126 allows the customer to communicate with the selected customer service representative.

The matching and advising module 110 also monitors the interaction styles of the customers and the customer service representatives for any changes or transitions from one interaction style to another as the communication between the matched customer and customer service representative progresses. In some embodiments, the matching and advising module 110 determines whether the complementariness of the interaction styles of the matched customer and customer service representative changes. The complementariness may change due to a change in the interaction style of the customer and/or due to a change in the interaction style of the customer service representative.

The matching and advising module 110 automatically generates an advice to present to a customer service representative in communication with a customer based on the interaction styles in order to influence the course of communication between the customer and the customer service representative. The matching and advising module 110 may alert the customer service representative about the interaction style (e.g., detect growing levels of irritability/anger and issue an alert) of the customer and suggest a set of prompts or a service script for the customer service representative to use to adjust the course of the communication. The advice may also relate to guidance on how the customer service representative may present information in terms of such aspects as speed of presentation, vocal characteristics, word use, emotionality, etc. In some embodiments, the advising may be done via messages conveyed on a head-mounted display (e.g., Google Glass), screens, earpieces, reports to customer service representative, etc.

During a communication between a customer and a customer service representative, the matching and advising module 110 may replace the customer service representative with another available customer service representative whose interaction style better matches the interaction style of the customer. In some embodiments, the alternative customer service representative may be any of a human customer service representative, a team of customer service representatives, a question and answer (Q&A) artificial agent (e.g., IBM's DeepQA system) with useful natural language processing abilities, etc. The matching and advising module 110 widens the applicability of (and serve as a "front end" to) a Q&A artificial agent. For example, the matching and advising module 110 enhances such Q&A responses, so that the information or answers provided by the Q&A artificial agent have higher value. If the alternative customer service representative is a Q&A artificial agent, information may be emotively conveyed to a customer as useful. For example, the responses may be transformed into data that additionally represents a simulated emotional state and potentially transmitted using an avatar in a virtual world. Data representing an avatar that expresses the simulated emotional state may be generated and displayed.

In some embodiments, the matching and advising module 110 automatically performs confidence enhancing actions based on the customer information stored in the external information repository 120. As described above, the interaction style of a customer identified with a likelihood or a confidence level. When the value of confidence level is below a threshold, the matching and advising module 110 does not initiate a change in customer service representative (or getting help from an extra customer service representative) or a change in the service script or prompts. However, if the value of confidence level is greater than the threshold, the matching and advising module 110 automatically initiates a change in customer service representative (or obtains a helper customer service representative) or a change in service script or prompts.

If the confidence level is less than the threshold, the matching and advising module 110 automatically performs a confidence increasing action based on the customer information, such as an analysis of other customer in a customer's social network (e.g., people close to the customer), an analysis of prior fragments of text and/or speech of the customer, an analysis of a prior fragments of text and/or speech of individuals in the customer's social network, etc. that are gathered and processed by the customer information analyzing module 118 from the customer information sources 128. The matching and advising module 110 assigns various weights to the prior fragment. For example, the further into the past a fragment occurs, the lower the weights of such fragments the matching and advising module 110 assigns.

The matching and advising module 110 automatically performs other confidence increasing actions if the confidence level is smaller than the threshold. The matching and advising module 110 may use more public information obtained about a customer, for example, posts made in a social media account (e.g., Facebook), various public communications, an analysis of past help queries, demographic information associated with the customer, etc. gathered and processed by the customer information analyzing module 118. The use of such information may be approved in an opt-in fashion so that a customer gives permission to perform such analyses if he or she wishes to receive better help. Another confidence increasing action that the matching and advising module 110 may perform is to query the customer regarding whether it is estimating the customer's psychological state appropriately or correctly. For example, if the customer service representative is an artificial Q&A agent, it may ask the customer if he or she is confused or angry, in order to increase the value of confidence level.

Figure 4:
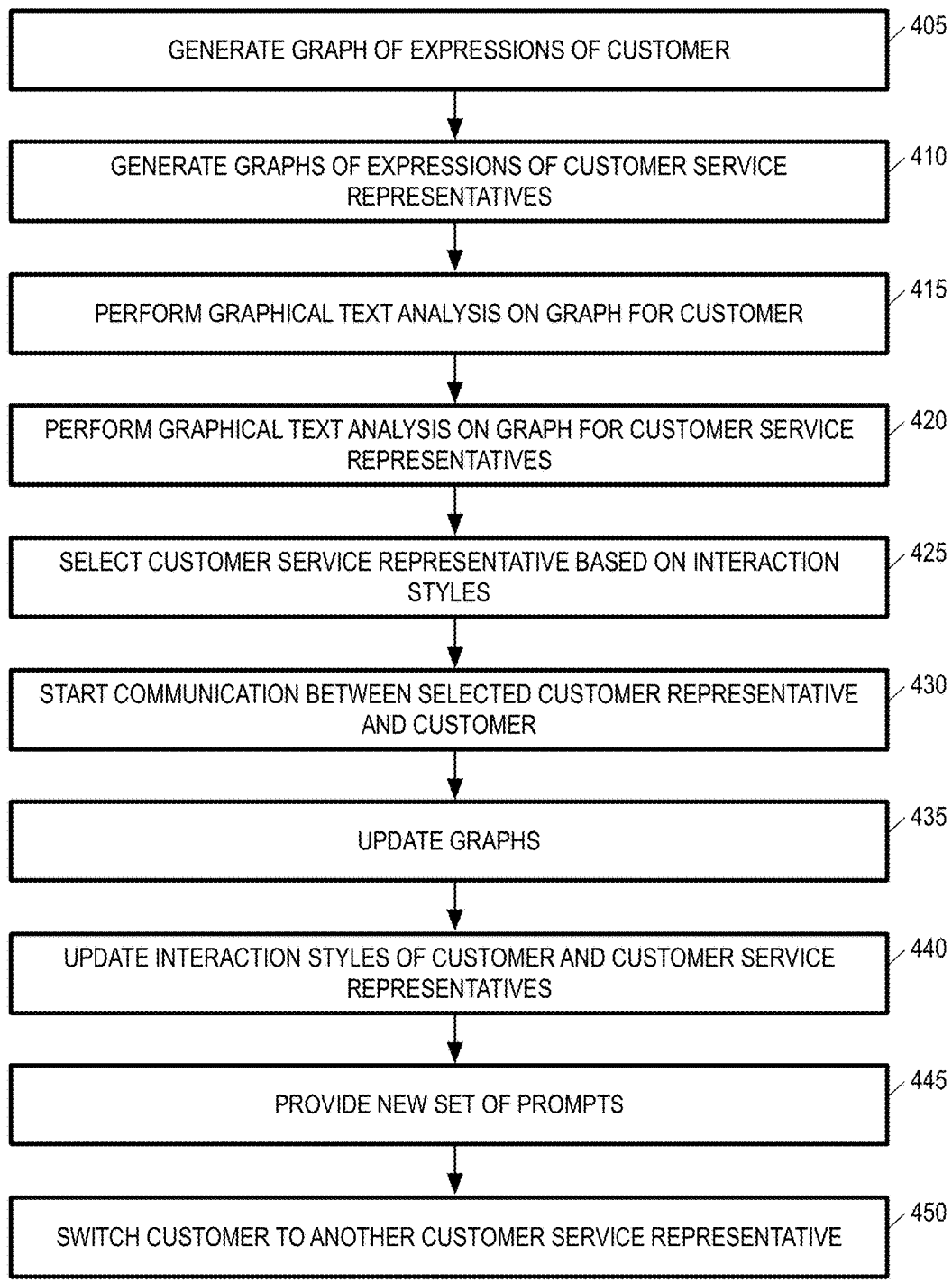
FIG. 4 depicts a process flow for facilitating communications between customers and customer service representatives according to an embodiment of the invention.

FIG. 4 illustrates a process flow for facilitating communications between customers and customer service representatives. In some embodiments, the system 100 performs the process flow shown in FIG. 4. At block 405, the system 100 generates a graph of expressions of a customer. In some embodiments, the system 100 uses an artificial agent with NLP to collect an initial set of expressions from the customer.

At block 410, the system 100 generates a graph of expressions of each customer service representative of a plurality of customer service representatives. The system 100 collects expressions of each customer service representative from other communications between the customer service agent and other customers.

At block 415, the system 100 performs a graphical text analysis on the graph for the customer to identify an interaction style of the customer. At block 420, the system 100 performs a graphical text analysis on the graph for each customer service representative to identify an interaction style of the customer service representative. In some embodiments, performing a graphical text analysis comprises determining a likelihood of a graph to belong to one of a plurality of clusters of previously generated graphs. Each cluster represents one or more different predefined interaction styles.

At block 425, the system 100 selects a customer service representative from the plurality of the customer service representatives based on the interaction style of the customer and the interaction styles of the plurality of the customer service representative. Specifically, in some embodiments, the system 100 selects a customer service representative who has an interaction style that best matches the interaction style of the customer. In some embodiments, the interaction style of a customer service representative best matches the interaction style of the customer when the interaction style of the customer service representative is closest to or the same as the interaction style of the customer. Alternatively or conjunctively, the interaction style of a customer service representative best matches the interaction style of the customer when the interaction style of the customer service representative best complements the interaction style of the customer.

At block 430, the system 100 starts a communication between the customer and the selected customer service representative. At block 435, the system 100 updates the graph of expressions of the customer and the graph of expressions of the selected customer service representative during the communication. At block 440, the system 100 performs a graphical text analysis on the updated graphs to update interaction styles of the customer and the selected service representative.

At block 445, in response to determining that a complementariness of the interaction styles of the customer and the selected customer service representative is changed, the system 100 provides a set of prompts to the selected customer service representative in order to guide the selected customer service during the communication. At block 450, in response to determining that the complementariness is changed, the system 100 switches the customer to another customer service representative who has an interaction style that better matches the updated interaction style of the customer. In some embodiments, a customer comprises a person teamed up with an artificial agent or comprises a group of two or more persons. Likewise, a customer service representative comprises a person teamed up with an artificial agent or comprises a group of two or more persons.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
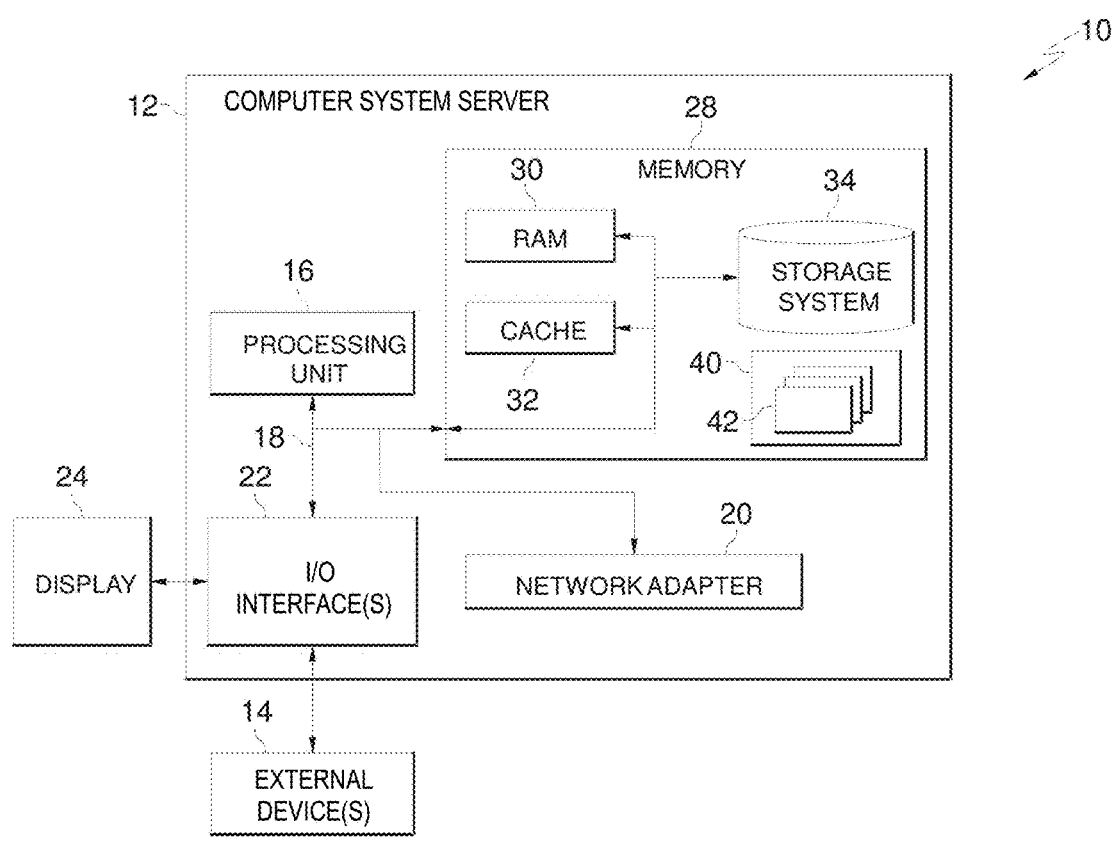
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
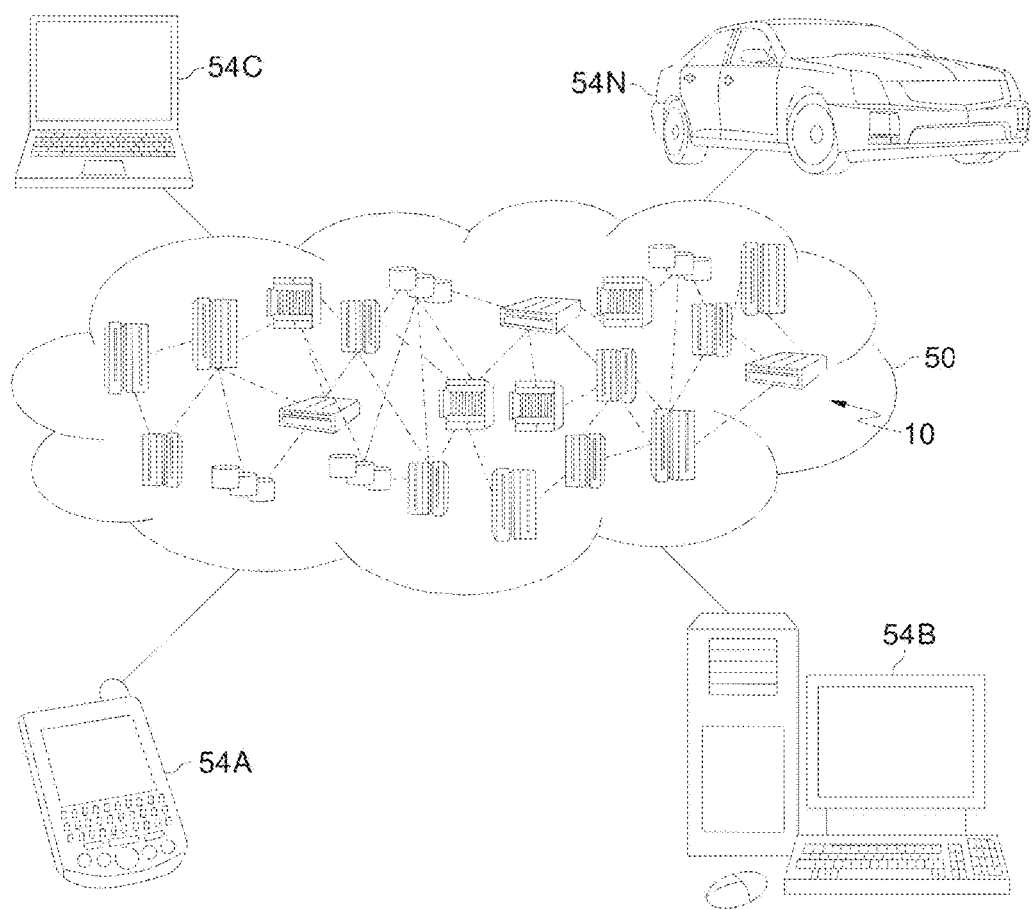
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
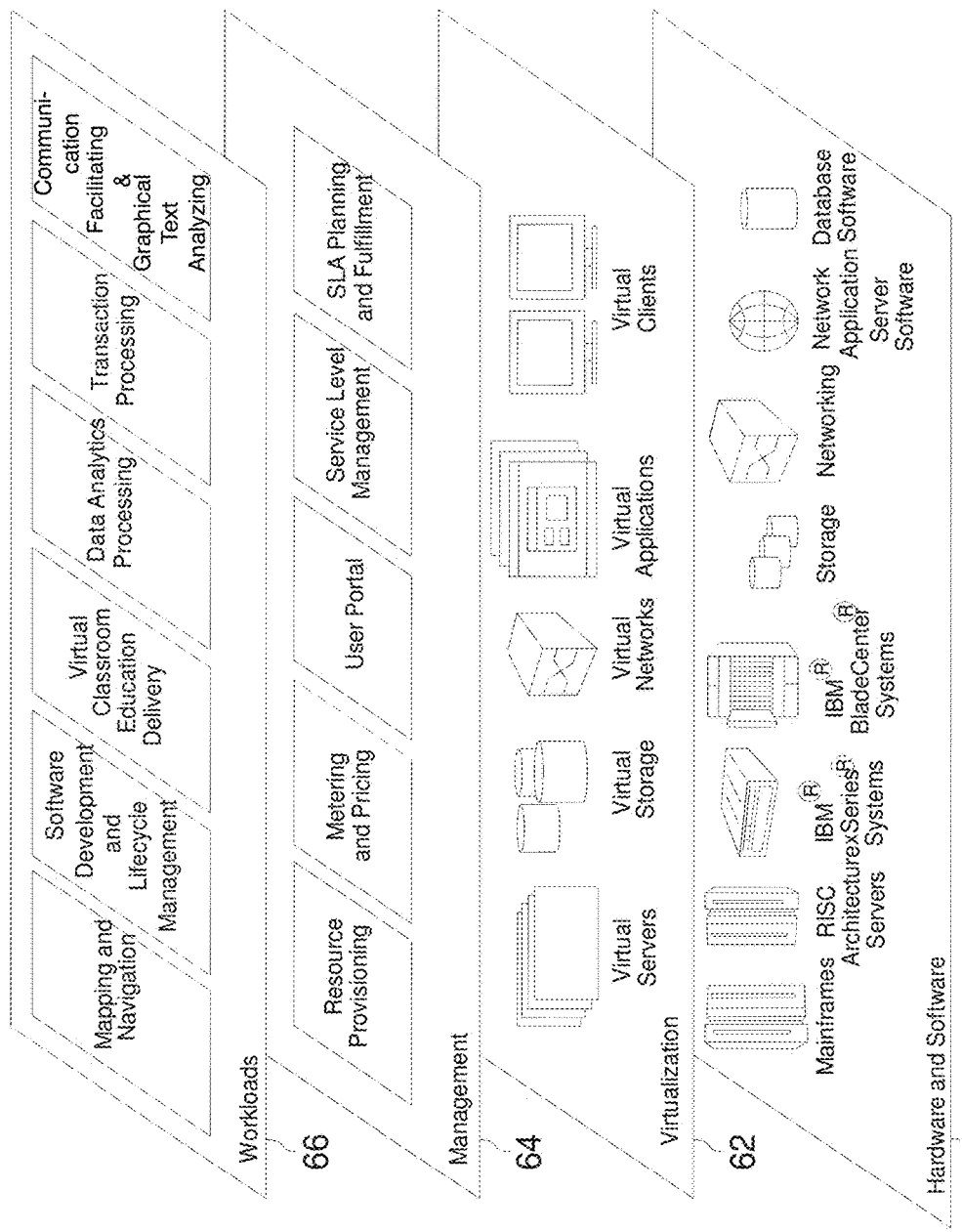
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM p Series® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and customer service communication facilitating and graphical text analyzing.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product, comprising:
a non-transitory computer readable storage medium having program instructions embodied therewith, the program instructions readable by a processing circuit to cause the processing circuit to perform a method of facilitating communications between customers and customer service representatives in a customer service environment, the method comprising:
performing a graphical text analysis on a graph of expressions of a customer to identify an interaction style of the customer;
performing a graphical text analysis on a graph of expressions for each customer service representative of a plurality of customer service representatives to identify an interaction style of each of the plurality of customer service representatives;
selecting a customer service representative from the plurality of the customer service representatives based on the interaction style of the customer and the interaction style of each of the plurality of customer service representatives; and
starting a communication between the customer and the selected customer service representative.

2. The computer program product of claim 1, wherein the selecting the customer service representative comprises selecting a customer service representative who has an interaction style that best matches the interaction style of the customer.

3. The computer program product of claim 1, wherein the method further comprises:
updating the graph of expressions of the customer and the graph of expressions of the selected customer service representative during the communication;
performing a graphical text analysis on the updated graphs to update interaction styles of the customer and the selected service representative; and
in response to determining that a complementariness of the interaction styles of the customer and the selected customer service representative is changed, providing a set of prompts to the selected customer service representative in order to guide the selected customer service during the communication.

4. The computer program product of claim 3, wherein the method further comprises:
in response to determining that the complementariness is changed, switching the customer to another customer service representative who has an interaction style that better matches the updated interaction style of the customer.

5. The computer program product of claim 1, wherein the method further comprises:
   using an artificial agent with natural language processing (NLP) to collect an initial set of expressions from the customer prior to selecting a customer service representative.

6. The computer program product of claim 1, wherein performing a graphical text analysis comprises determining a likelihood of a graph to belong to one of a plurality of clusters of previously generated graphs, each cluster representing one or more different predefined interaction styles.

7. The computer program product of claim 1, wherein the method further comprises:
   collecting expressions of each customer service representative from other communications between the customer service agent and other customers prior to the communication between the selected customer service representative and the customer.

8. The computer program product of claim 1, wherein a customer comprises a person teamed up with an artificial agent or comprises a group of two or more persons, wherein a customer service representative comprises a person teamed up with an artificial agent or comprises a group of two or more persons.

9. The computer program product of claim 1, further comprising:
   generating the graph of expressions of the customer prior to performing the graphical text analysis on the graph of expressions of the customer.

10. The computer program product of claim 1, further comprising:
    generating the graph of expressions of each customer service representative of the plurality of customer service representatives prior to performing the graphical text analysis on the graph of expressions for each customer service representative of the plurality of customer service representatives.

11. A computer system for a method of facilitating communications between customers and customer service representatives in a customer service environment, the system comprising:
    a memory having computer readable instructions; and
    a processor configured to execute the computer readable instructions, the instructions comprising:
    performing a graphical text analysis on a graph of expressions of a customer to identify an interaction style of the customer;
    performing a graphical text analysis on a graph of expressions for each customer service representative of a plurality of customer service representatives to identify an interaction style of each of the plurality of customer service representatives;
    selecting a customer service representative from the plurality of the customer service representatives based on the interaction style of the customer and the interaction style of each of the plurality of customer service representatives; and
    starting a communication between the customer and the selected customer service representative.

12. The system of claim 11, wherein the selecting the customer service representative comprises selecting a customer service representative who has an interaction style that best matches the interaction style of the customer.

13. The system of claim 11, wherein the instructions further comprise:
    updating the graph of expressions of the customer and the graph of expressions of the selected customer service representative during the communication;
    performing a graphical text analysis on the updated graphs to update interaction styles of the customer and the selected service representative; and
    in response to determining that a complementariness of the interaction styles of the customer and the selected customer service representative is changed, providing a set of prompts to the selected customer service representative in order to guide the selected customer service during the communication.

14. The system of claim 13, wherein the instructions further comprise:
    in response to determining that the complementariness is changed, switching the customer to another customer service representative who has an interaction style that better matches the updated interaction style of the customer.

15. The system of claim 11, wherein the instructions further comprise:
    using an artificial agent with natural language processing (NLP) to collect an initial set of expressions from the customer prior to selecting a customer service representative.

16. The system of claim 11, wherein performing a graphical text analysis comprises determining a likelihood of a graph to belong to one of a plurality of clusters of previously generated graphs, each cluster representing one or more different predefined interaction styles.

17. The system of claim 11, wherein the instructions further comprise:
    generating the graph of expressions of the customer prior to performing the graphical text analysis on the graph of expressions of the customer.

18. The system of claim 11, wherein the instructions further comprise:
    generating the graph of expressions of each customer service representative of the plurality of customer service representatives prior to performing the graphical text analysis on the graph of expressions for each customer service representative of the plurality of customer service representatives.

* * * * *